(12) United States Patent
Yomogida

(10) Patent No.: US 6,584,953 B2
(45) Date of Patent: Jul. 1, 2003

(54) COMMON RAIL FUEL INJECTION DEVICE

(75) Inventor: Koichiro Yomogida, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 36 days.

(21) Appl. No.: 09/991,240

(22) Filed: Nov. 14, 2001

(65) Prior Publication Data

US 2003/0089334 A1 May 15, 2003

(51) Int. Cl.$^7$ .............................. F02B 3/10; F02D 41/40
(52) U.S. Cl. ....................... 123/300; 123/446; 123/478
(58) Field of Search ............................... 123/299, 300, 123/446, 447, 467, 478, 480, 501, 502, 456

(56) References Cited

U.S. PATENT DOCUMENTS

| 4,653,447 | A | | 3/1987 | Linder et al. ............... 123/357 |
|---|---|---|---|---|
| 6,032,642 | A | * | 3/2000 | Trumbower et al. ........ 123/299 |
| 6,386,176 | B1 | * | 5/2002 | McGee ........................ 123/299 |
| 6,390,058 | B1 | * | 5/2002 | Takahashi et al. .......... 123/299 |

FOREIGN PATENT DOCUMENTS

JP         61-286541         12/1986 ............. F02D/1/16

* cited by examiner

*Primary Examiner*—Tony M. Argenbright
(74) *Attorney, Agent, or Firm*—McCormick, Paulding & Huber LLP

(57) ABSTRACT

This invention provides a common rail fuel injection device, which ensures the functions of pilot injection even at high fuel pressure in the common rails, by changing the injection end delay period of the pilot injection in accordance with the fuel pressure in the common rail. The period displacement $\Delta SOCp$ to be applied to the pulse start time of the pilot injection command pulse CPp, with respect to the top dead centre T7, is set to a timing that is advanced by the interval period Tint, pilot injection end delay period Tdpe and injection pulse width Pwp for pilot injection, with respect to the main injection start time T6.

4 Claims, 6 Drawing Sheets

COMMON RAIL FUEL INJECTION DEVICE

CROSS REFERENCES TO RELATED APPLICATIONS

This application corresponds to Japanese Patent Application No. 2000-069990 filed in JPO on Mar. 14, 2000, the entire disclosure of which is incorporated herein by reference.

BACKGROUND OF THE INVENTION

1. Field of the Invention

The present invention relates to a common rail fuel injection device for injecting fuel accumulated in a pressurized state in a common rail, via injectors, and more particularly, to a common rail fuel injection device for performing fuel injection via injectors, by means of a main injection, and a pilot injection whereby a small quantity of fuel is injected prior to the main injection.

2. Description of the Related Art

In the prior art, a common rail fuel injection system is known as a method for obtaining a higher fuel injection pressure in a fuel injection system for an engine, by controlling the injection conditions of fuel from injectors, such as the injection timing and injection quantity, to optimal conditions corresponding to the operating state of the engine. A common rail fuel injection system is a system wherein an operating fluid raised to a prescribed pressure by means of a fuel supply pump, is accumulated in a pressurized state inside a common rail, and based on the action of the pressure of the operating fluid, fuel is injected from injectors disposed respectively with respect to a plurality of cylinders, into combustion chambers thereof, under optimal fuel injection conditions, such as fuel injection quantity and fuel injection time, and the like, as determined by a controller in accordance with the operating state of the engine. Each injector is provided with a control valve to perform control for passing or blocking fuel supplied via a fuel supply pipe.

If the fuel itself forms the operating fluid, then the common rail accumulates fuel in a pressurized state therein, and a fuel pressure corresponding to the injection pressure is exerted constantly in the fuel supply path formed from the common rail, via fuel supply pipes, to nozzles formed at the front end of each injector. In order that each injector injects fuel only at a prescribed time, control valves are provided which open and shut the fuel supply path by being driven by an actuator, such as an electromagnetic actuator, magnetic distortion element, or the like. The controller controls the pressure in the common rail and the operation of each injector's control valve, in such a manner that the pressurized fuel is injected by each injector at optimal injection conditions with respect to the operating state of the engine.

In a common rail fuel injection device, the control valves are operated by actuators on the basis of electrical signals output by the controller. However, there is a delay time caused by response delay, from the time at which current is applied to the actuator due to the output signal from the controller, until the time at which the control valve actually performs an opening/shutting operation. Therefore, the target fuel injection time is determined based on the operating state of the engine, and the aforementioned response delay is taken into consideration when determining the drive time of the control valve to the injector, in other words, the output timing of the injection pulse constituting a command pulse from the controller, based on the target fuel injection time.

FIG. 5 shows an overview of a common rail fuel injection system in which a common rail fuel injection device is applied. The common rail fuel injection system 1 illustrated in FIG. 5 is a system for a six-cylinder engine, wherein fuel in a fuel tank 4 is passed through a pre-filter 5 and a filter 6 comprising a circulating valve and demoisturizer, whereupon it travels along a fuel pipe 7 and is supplied to a fuel supply pump 8, which is, for example, a variable capacity high-pressure plunger-type pump. The fuel supply pump 8 is driven by the engine output, and it raised the fuel to the prescribed pressure required, and supplies it to a common rail 2, via a fuel valve 9 and pressure control valve 11. Before the common rail 2 on the output side of the fuel supply pump 8, a pressure control valve 11 is provided in order to maintain the fuel pressure in the common rail 2 at a prescribed pressure. Fuel relieved from the fuel supply pump 8 is returned via a return pipe 12 to the fuel tank 4. The fuel inside the common rail 2 is supplied to a plurality of (six) injectors 10 (only one injector is depicted here) via a fuel supply pipe 3. Of the fuel that is supplied to the injector 10 via the fuel supply pipe 3, that fuel which is not consumed in the injection into the combustion chamber, and the fuel that is relieved by the pressure control valve 11 is returned to the fuel tank 4 by means of return pipes 13 and 14.

The controller 15 is an electronic control unit, which inputs signals from various sensors 16 in order to detect the operating state of the engine, such as, an engine cylinder discriminating sensor, a crank angle sensor for detecting the engine revolutions Ne and the top dead centre (TDC), an accelerator opening sensor for detecting the accelerator pedal operation amount Ac, a water temperature sensor for detecting the temperature of the cooling water, an inlet tube pressure sensor for detecting the internal pressure of the inlet tube, and the like. The pressure of the common rail 2 is detected by a pressure sensor 18 provided at the pressure control valve 11, and a detection signal for the fuel pressure Pr inside the common rail 2 (hereinafter, called fuel pressure in the common rail,) as detected by the pressure sensor 18 is also input to the controller 15. Based on these signals, the controller 15 controls the injection conditions for the fuel from the injectors 10, in other words, the fuel injection time (injection start timing and duration), injection quantity, and the like, in such a manner that the engine output is optimally suited to the operating state thereof. The fuel in the common rail 2 is consumed by being injected from the injectors 10, and hence the fuel pressure inside the common rail falls, but the controller 15 controls the pressure of the fuel supplied from the fuel supply pump 8 by means of the control section 19 of the pressure control valve 11, in such a manner that the fuel pressure in the common rail Pr remains uniform, or become equal to the fuel injection pressure required according to the operating state of the engine.

FIG. 6 is an approximate longitudinal diagram showing one example of an injector used in a common rail fuel injection system. The injector 10 is installed in a sealed state by means of a sealing member in a cavity portion provided in the base of the cylinder head, or the like (not illustrated). The fuel supply pipe 3 is connected to the upper side portion of the injector 10, and this fuel supply pipe 3 forms a fuel supply path in conjunction with fuel passages 21, 22 formed inside the injector 10 proper. Nozzles 25 are formed at the front end portion of the injector 10, and fuel supplied via the fuel supply path passes via a fuel reservoir 23 and needle valve 24 and is injected into the combustion chamber from the nozzles 25, which open when the needle valve 24 lifts.

In order to control the lifting of the needle valve 24, the injector 10 is provided with a needle lifting mechanism based on a pressure control chamber. An electromagnetic actuator 26 driving an electromagnetic valve is provided on the uppermost portion of the injector 10, and a control current corresponding to a command pulse from the controller 15 is supplied via a signal line 27 to the solenoid 28 of the electromagnetic actuator 26. When the solenoid 28 is excited, an armature 29 rises up and opens a control valve 32 provided at the end of the fuel path 31, thereby releasing the pressure of the fuel supplied from the fuel supply path to the pressure control chamber 30, by means of the fuel passage 31. A control piston 34 is provided in a raisable and lowerable fashion inside a cavity 33 formed inside the injector 10. Since the lifting force pushing the control piston 34 upwards due to the fuel pressure acting on the tapered face 36 surrounding the fuel reservoir 23 is greater than the force pressing down on the control piston 34 due to the lowered pressure inside the pressure control chamber 30 and the spring force of a return spring 35, the control piston 34 is raised up. Consequently, the needle valve 24 lifts and fuel is injected from the nozzles 25. The fuel injection time is determined by the lift timing of the needle valve 24, whilst the fuel injection quantity is determined by the fuel pressure in the fuel supply path, and the lifting of the needle valve 24 (amount of lift, duration of lift). In other words, the needle valve 24 is raised and lowered by the action of the fuel pressure inside the pressure control chamber 30, and the control valve 32 releases the fuel pressure inside the pressure control chamber 30 by discharging fuel from inside the pressure control chamber 30. The fuel discharged via the fuel passage 31 and the fuel which leaks into the cavity 33 and is discharged in to a low-pressure chamber 37 are returned to the fuel tank 4 by means of leak passage 38 and return pipe 13 (FIG. 3).

In general, the relationship between the fuel injection quantity at the injection 10 and the pulse width of the command pulse output by the controller 15 is determined by a map which uses the fuel pressure in the common rail Pr (fuel pressure inside the common rail 2) as a parameter. Assuming the fuel pressure in the common rail Pr is uniform, the larger the pulse width, the greater the quantity of fuel injected, whereas if the pulse width remains the same, the fuel injection quantity will rise with increase in the fuel pressure in the common rail Pr. On the other hand, the fuel injection starts and stops with a respective time delay compared to the fall time and rise time of the command pulse. Consequently, it is possible to control the injection timing and injection quantity by controlling the on timing and off timing of the command pulse. A uniform relationship between the basic injection quantity and the engine revolutions is previously determined as a basic injection quantity characteristics map, taking accelerator pedal operation amount as a parameter, and the injected fuel quantity for each fuel cycle is then determined by calculation from this basic injection quantity characteristics map, according to the current operating state of the engine.

In accordance with the fuel injection at each cylinder during the engine cycle, the fuel pressure in the common rail Pr follows a cycle whereby it starts to fall at a time delay after the start of injection, and after injection has been completed, it recovers due to output of fuel from the fuel supply pump 8 in order to inject fuel at the cylinder where next combustion is to occur according to the combustion sequence. Since the engine is a multiple-cylinder engine, as shown in FIG. 5, the controller 15 controls the fuel injection from the injector 10 separately for each cylinder.

A method for determining the output timing of the injection pulse output by the controller to the actuator of the injector in order to perform fuel injection, is disclosed, for example, in Japanese Patent Laid-open No.(Sho) 61-31643, or Japanese Patent Laid-open No.(Sho) 61-286541. Japanese Patent Laid-open No.(Sho) 61-31643 discloses a fuel injection quantity control device for an engine, wherein fuel is supplied to an engine by means of a fuel pump and the start and end of fuel injection to the engine is determined by electromagnetic injection valves, which seeks to control variation in operating characteristics caused by individual disparities or temporal change in electromagnetic injection valves by taking account of the delay time arising in the lift and fall of the needle of the electromagnetic valves, and controlling the injection start, injection end, or injection timing according to the operating characteristics of the electromagnetic injection valves, such as their fully-closed and fully-open time periods, or closing and opening speed, and the like.

Japanese Patent Laid-open No.(Sho) 61-286541 discloses a fuel injection pump provided with an electromagnetic valve between a fuel pressure chamber and a low-pressure section, the fuel injection timing and fuel injection quantity being controlled by controlling the opening and closing times of this electromagnetic valve, wherein the injection timings for all the cylinders can be controlled accurately in accordance with prescribed target values, by taking the response delay of the electromagnetic valve into account, even if only one sensor is provided for detecting the ignition timing, or the fuel injection start timing, or the like, which affect the start of fuel combustion.

As means for lowering combustion noise and preventing deterioration of exhaust gas characteristics in a diesel engine, so-called pilot injection control is performed whereby a small quantity of fuel is injected prior to the main injection. By performing this pilot injection, it is possible to raise the temperature of the combustion chamber in advance and hence prevent sudden combustion of the injected fuel, and consequently, the generation of so-called diesel "knock" can be prevented, and the ratio of nitrogen oxide contained in the exhaust gas can also be reduced. The pilot injection quantity is determined by taking account of the amount of nitrogen oxide generated, as determined by experimentation. Pilot injection is generally necessary when the engine is in a low-load or low-revolution operating state, and therefore the pilot injection quantity is determined either as an injection quantity of a small ratio compared to the overall injection quantity, or as a universal small absolute quantity.

In a common rail fuel injection device, the main injection time for performing the main fuel injection, the interval period from the end of the pilot injection until the main injection time, and the pilot injection quantity, are determined according to the operating state of the engine, and the output time of the pilot injection pulse output from the controller in order to perform pilot injection is calculated back from aforementioned main injection time, according to the sum of the interval period and the pilot injection period determined from the pilot injection quantity, and furthermore, the response delay from the time at which an output signal is emitted by the controller until the control valve of the injector starts to operate is also taken into account in determining the output time of the pilot injection pulse.

When performing pilot injection in a common rail fuel injection device, if injection is performed when the drive current of the injection pulse signal output from the controller is on, then when the current switches off, the rear pressure on the needle of the needle valve (pressure inside the pressure control chamber) will rise, the needle will be pushed downwards, and the nozzles are closed by the needle valve, thus ending the pilot injection. In this case, if the fuel pressure in the common rail is high, then the fuel pressure at the front end of the needle will act to push the needle upwards, and hence an additional force is required to push the needle down. If there is insufficient force pressing the needle down, then it will take time for the nozzles to close, and hence the pilot injection end time will be delayed, causing a corresponding alteration to the internal time, and in extreme cases, the pilot injection and main injection may become combined, similarly to performing main injection over a long period of time. In turn, this will cause the actual quantity of actual fuel injected to increase, leading to large torque variations and a state of over-torque, whilst also reducing the combustion noise reduction effects of the pilot injection operation.

Therefore, in a common rail fuel injection device which performs fuel injection comprising a main injection and a pilot injection implemented prior to the main injection, it is necessary to resolve the problem of ensuring a prescribed interval time, and performing accurate pilot injection to the engine by improving control of pilot injection, even in cases where the fuel pressure in the common rail increases.

SUMMARY OF THE INVENTION

It is an object of the present invention to provide a common rail fuel injection device which accumulates pressurized fuel in a common rail, and injects fuel supplied by the common rail via injectors, in a separate pilot injection and main injection, based on detection signals from detecting means for detecting the operating state of the engine, wherein the pilot injection and main injection are clearly separated, and the beneficial effects of the pilot injection in suppressing combustion noise and preventing deterioration of the exhaust gas characteristics, and the like, can be reliably obtained.

This invention relates to a common rail fuel injection device comprising: a common rail for accumulating pressurized fuel from a high-pressure fuel supply pump; a detecting means for detecting an operating state of an engine; and an injector for injecting fuel supplied from said common rail into a combustion chamber, said injector divides fuel injection into the main injection and the pilot injection with an interval period prior to said main injection, in accordance with an operating state of the engine detected by the detecting means; a controller for calculating command pulses and outputting drive signals corresponding to said command pulses to the injector; wherein said controller calculates the interval period prior to said main injection, a pilot injection end delay period from the pulse end of said pilot injection command pulse to the pilot injection end, and a period corresponding to pulse width of said pilot injection command pulse corresponding to said pilot injection quantity, in response to said operating state of the engine as detected by said detecting means, and said controller sets the pulse start time of said pilot injection command pulse by being advanced by said interval period, said pilot injection end delay period and said period corresponding to pulse width of said pilot injection command pulse from previously determined injection start time of said main injection.

By adopting this composition, the controller calculates the pilot injection end delay period from the pulse end time of the pilot injection command pulse to the injection end time of the pilot injection, based on the operating state of the engine. This calculation derives the pilot injection end delay time, but it is also possible to read this out from a map, rather than performing function-based calculation. Consequently, the pilot injection end delay period is inferred accurately based on the operating state of the engine, and by taking this pilot injection end delay time into account when determining the pulse start time of the pilot injection command pulse, it is possible reliably to ensure the interval period which separates the pilot injection and the main injection, and to improve the controllability of the pilot injection, even when the common rail fuel pressure is high, thereby preventing deterioration of the pilot injection's functions of suppressing noise, improving exhaust gas characteristics, and the like.

The controller calculates the pilot injection end delay period based on the fuel pressure in the common rail as detected by a pressure sensor provided in the common rail, or a target fuel pressure in the common rail calculated based on the operating state of the engine. Desirably, the common rail fuel pressure is the actual fuel pressure in the common rail as detected by a pressure sensor, but if the fuel pressure in the common rail has good controllability, then a target fuel pressure in the common rail may also be used. A target fuel pressure in the common rail may be derived from a map, or the like, based on the engine revolutions and accelerator operation amount, detected as the operating state of the engine.

Moreover, the controller sets the pilot injection end delay period to a greater value, as the fuel pressure in the common rail increases. By setting a longer pilot injection end delay period so as to advance the pulse start time of the pilot injection command pulse, as the common rail fuel pressure increases, it is possible to ensure the interval period between the pilot injection and the main injection by preventing delay to the end of the pilot injection even when the common rail fuel pressure is high.

Each of the injectors comprises: a pressure control chamber into which a portion of the fuel supplied from the common rail is introduced; a needle valve which opens and closes nozzles for injecting fuel formed in the front end section of the injector, by being raised or lowered based on the action of the pressure of fuel inside the pressure control chamber; an open/shut valve for releasing the fuel pressure inside the pressure control chamber by discharging fuel from inside the pressure control chamber; and an actuator for operating the open/shut valve.

Desirably, the common rail fuel injection device according to the present invention comprises: an engine revolution speed sensor for detecting engine revolution speed; an accelerator operation amount sensor for detecting the amount of operation of the accelerator; and a pressure sensor for detecting the fuel pressure in the common rail; and the controller calculates a total fuel injection quantity based on the engine revolution speed detected by the engine revolution speed sensor and the accelerator operation amount as detected by the accelerator operation amount sensor, determines the pilot injection quantity, the interval period and the main injection start time on the basis of the total fuel injection quantity and the engine revolution speed, determines an injector drive delay period from the pulse start time of the main injection command pulse to the injection start time of the main injection, based on the interval period and the common rail fuel pressure, and sets the pulse start time of the main injection command pulse by advancing the injector drive delay period with respect to the main injection start time.

Desirably, the controller determines the pulse width of the pilot injection command pulse based on the pilot injection quantity and the common rail fuel pressure.

Desirably, the controller calculates the main injection quantity by subtracting the pilot injection quantity from the total fuel injection quantity, determines a basic pulse width for the main injection command pulse based on the common rail fuel pressure and the main injection quantity, determines a correction pulse width for the main injection command pulse based on the common rail fuel pressure and the interval period, and calculates the pulse width of the main injection command pulse by summing the basic pulse width and the correction pulse width.

Desirably, the main injection start time, the interval period, the pilot injection end delay period, and the pulse width and pulse start time of the pilot injection command pulse are values expressed in crank angle units.

Desirably, the main injection start time and the pulse start time of the pilot injection command pulse is values with respect to the top dead centre.

Desirably, the common rail fuel injection device according to the present invention is applied to a diesel engine.

Moreover, the present invention also relates to a fuel injection control method for a common rail fuel injection device comprising: a common rail for accumulating pressurized fuel from a high-pressure fuel supply pump; a detecting means for detecting an operating state of an engine; and an injector for injecting fuel supplied from said common rail into a combustion chamber, said injector divides fuel injection into the main injection and the pilot injection with an interval period prior to said main injection, in accordance with an operating state of the engine detected by the detecting means; a controller for calculating command pulses and outputting drive signals corresponding to said command pulses to the injector; wherein said controller calculates the interval period prior to said main injection, a pilot injection end delay period from the pulse end of said pilot injection command pulse to the pilot injection end, and a period corresponding to pulse width of said pilot injection command pulse corresponding to said pilot injection quantity, in response to said operating state of the engine as detected by said detecting means, and said controller sets the pulse start time of said pilot injection command pulse by being advanced by said interval period, said pilot injection end delay period and said period corresponding to pulse width of said pilot injection command pulse from previously determined injection start time of said main injection.

Desirably, the controller calculates the pilot injection end delay period based on the fuel pressure in the common rail as detected by a pressure sensor provided in the common rail, or a target fuel pressure in the common rail calculated from the operating state of the engine.

Desirably, the controller sets the pilot injection end delay period to a greater value, as the fuel pressure in the common rail.

Desirably, the injectors each comprise: a pressure control chamber into which a portion of the fuel supplied from the common rail is introduced; a needle valve which opens and closes nozzles for injecting fuel formed in the front end section of the injector, by being raised or lowered due to the action of the pressure of fuel inside the pressure control chamber; an open/shut valve for releasing the fuel pressure inside the pressure control chamber by discharging fuel from inside the pressure control chamber; and an actuator for operating the open/shut valve.

Desirably, the common rail fuel injection device comprises: an engine revolution speed sensor for detecting engine revolution speed; an accelerator operation amount sensor for detecting the amount of operation of the accelerator; and a pressure sensor for detecting the fuel pressure in the common rail; and the controller calculates a total fuel injection quantity based on the engine revolution speed detected by the engine revolution speed sensor and the accelerator operation amount as detected by the accelerator operation amount sensor, determines the pilot injection quantity, the interval period and the main injection start time based on the total fuel injection quantity and the engine revolution speed, determines an injector drive delay period from the pulse start time of the main injection command pulse to the injection start time of the main injection, based on the interval period and the common rail fuel pressure, and sets the pulse start time of the main injection command pulse by advancing the injector drive delay period with respect to the main injection start time.

Desirably, the controller determines the pulse width of the pilot injection command pulse based on the pilot injection quantity and the common rail fuel pressure.

Desirably, the controller calculates the main injection quantity by subtracting the pilot injection quantity from the total fuel injection quantity, determines a basic pulse width for the main injection command pulse based on the common rail fuel pressure and the main injection quantity, determines a correction pulse width for the main injection command pulse based on the common rail fuel pressure and the interval period, and calculates the pulse width of the main injection command pulse by summing the basic pulse width and the correction pulse width.

Desirably, the main injection start time, the interval period, the pilot injection end delay period, and the pulse width and pulse start time of the pilot injection command pulse are values expressed in crank angle units.

Desirably, the main injection start time and the pulse start time of the pilot injection command pulse is values with respect to the top dead centre.

Desirably, the fuel injection control method for a common rail fuel injection device according to the present invention is applied to a diesel engine.

DETAILED DESCRIPTION OF THE INVENTION

Figure 1:
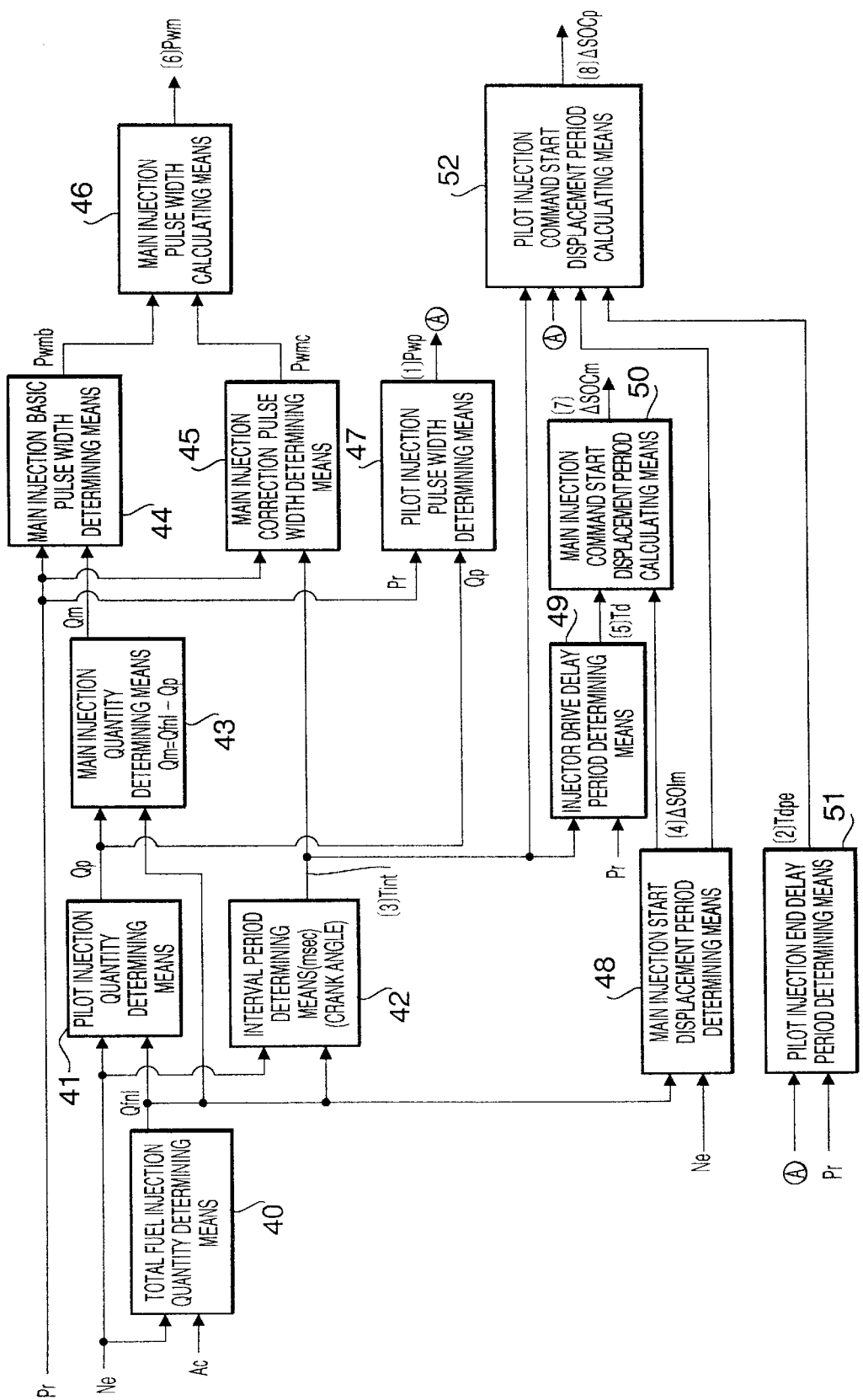
FIG. 1 is a block diagram showing one example of a controller in a common rail fuel injection device according to the present invention.
Figure 2:
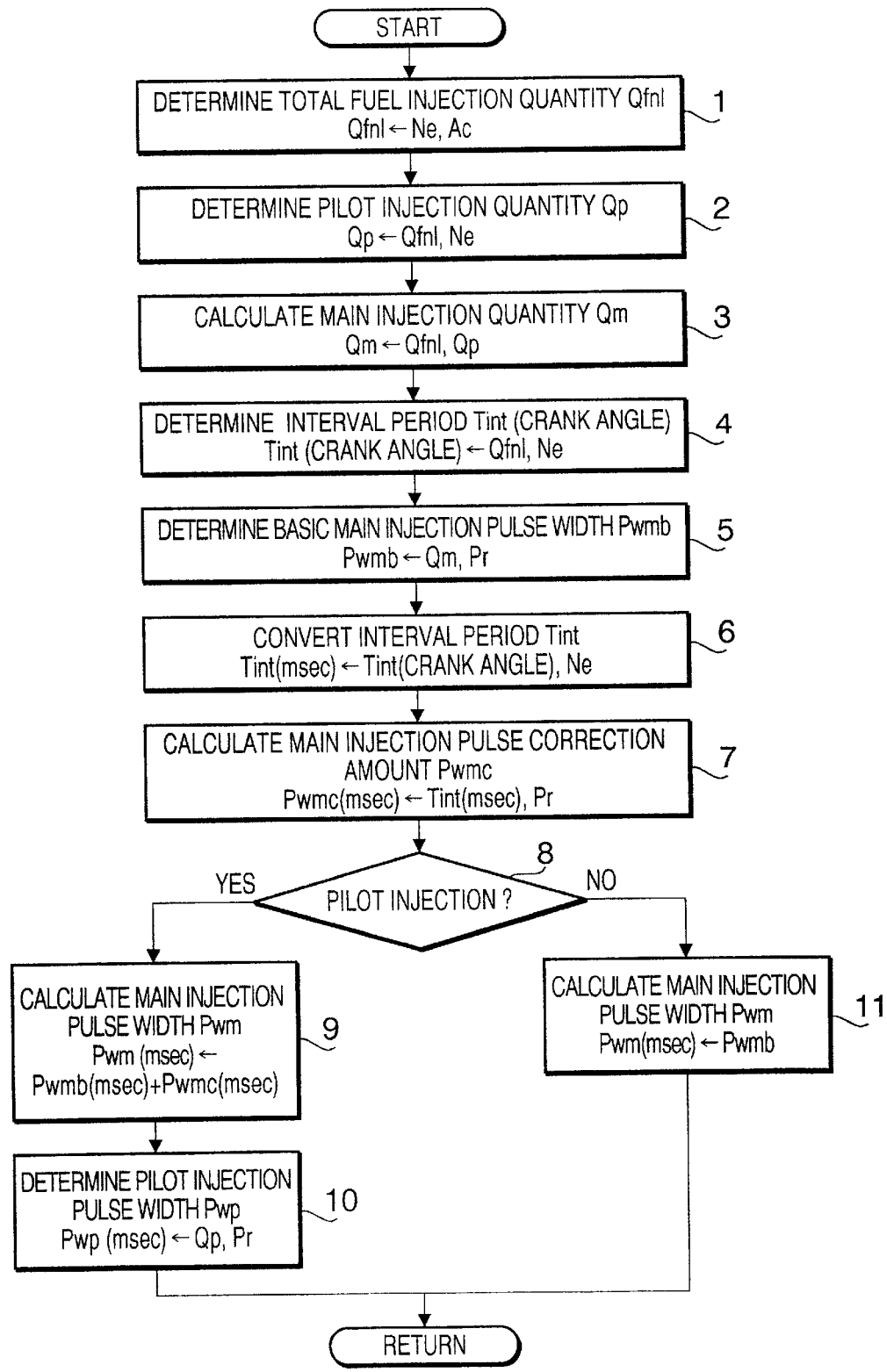
FIG. 2 is a flowchart showing one example of a control flow for determining the pulse width of respective injection command pulses in the common rail fuel injection device illustrated in FIG. 1.
Figure 3:
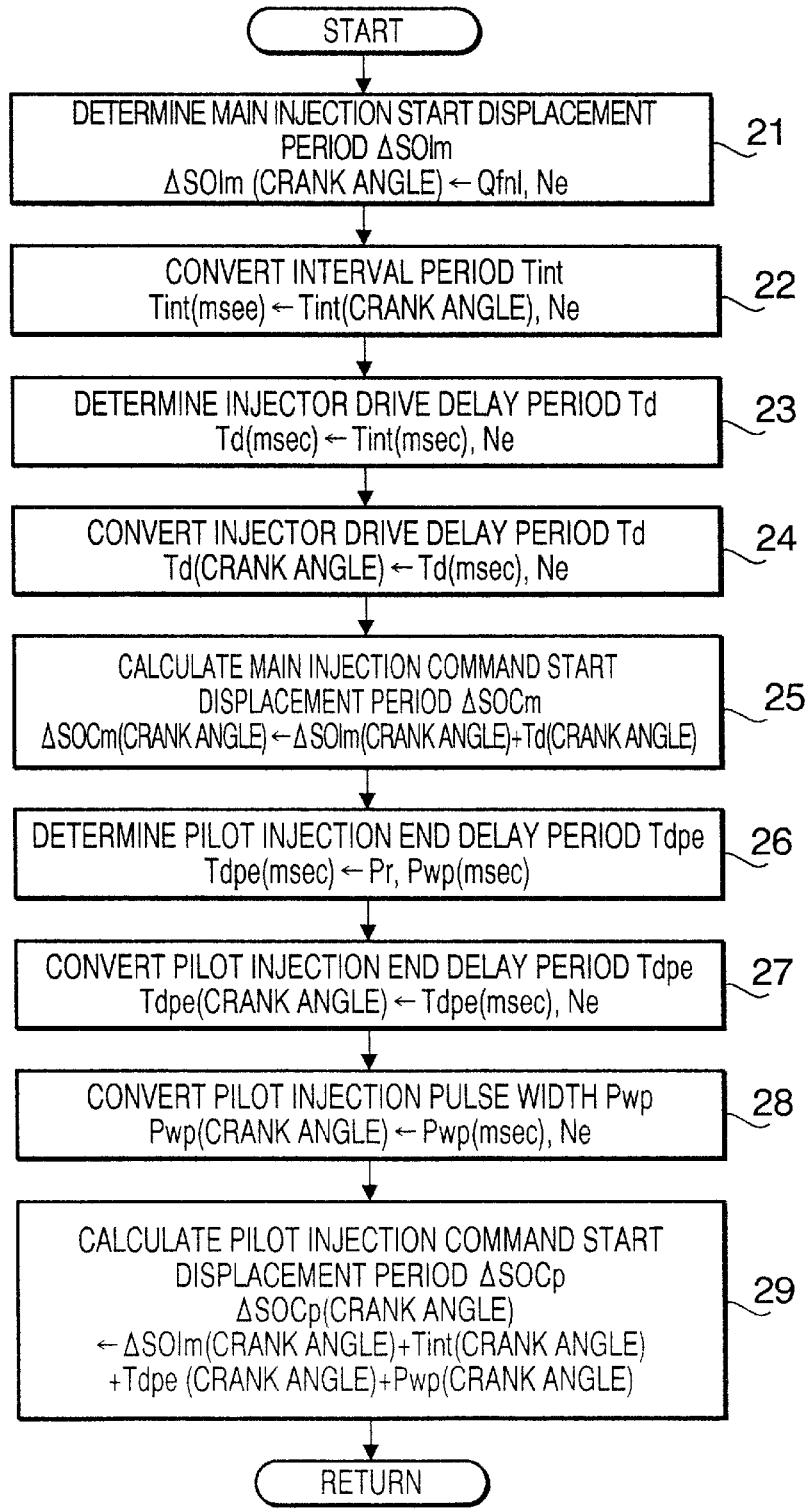
FIG. 3 is a flowchart showing one example of a control flow for determining the pulse start timing of respective injection command pulses in the common rail fuel injection device illustrated in FIG. 1.
Figure 4:
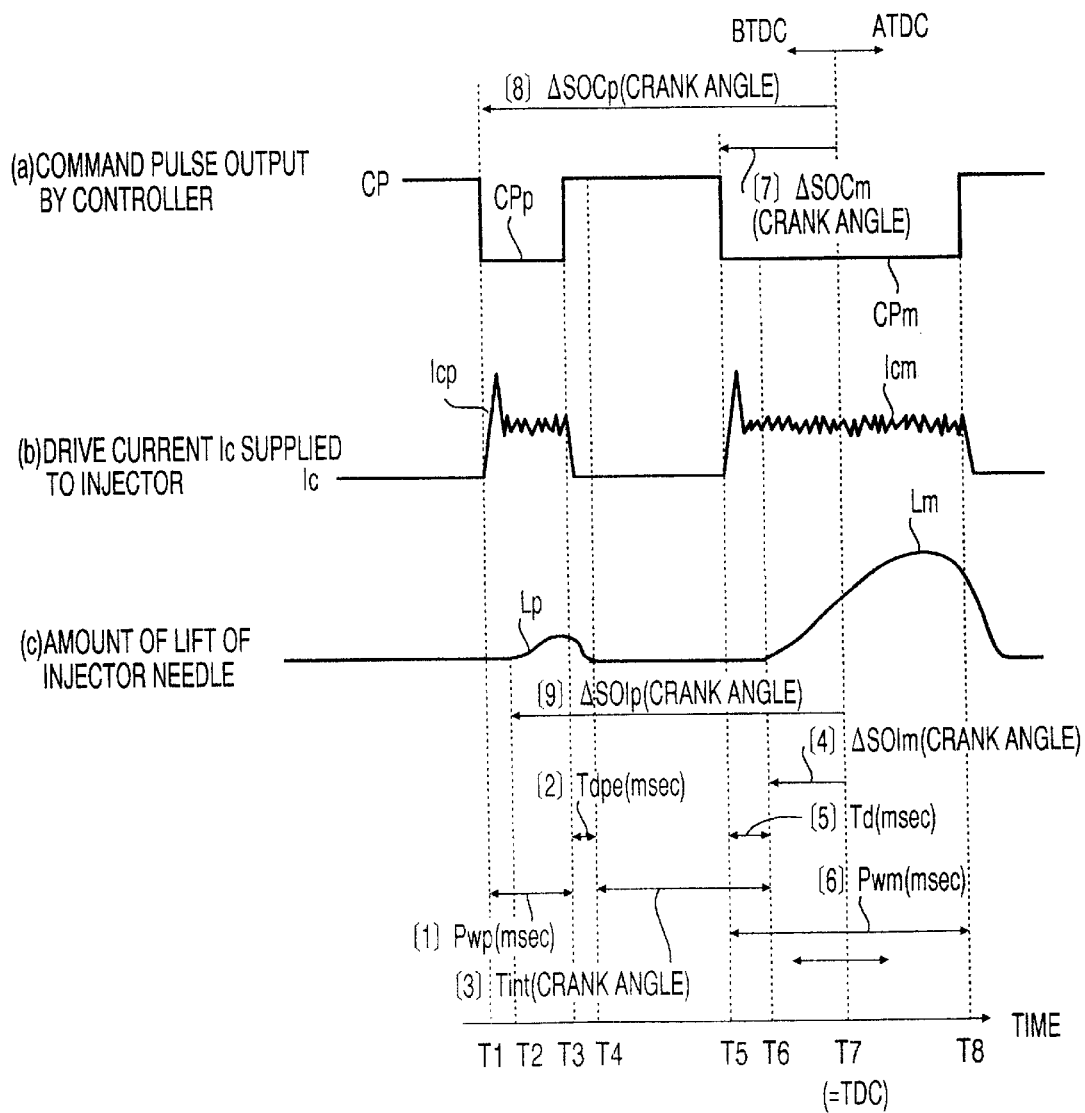
FIG. 4 is a timing chart for injector drive control in the common rail fuel injection device according to the present invention.
Figure 5:
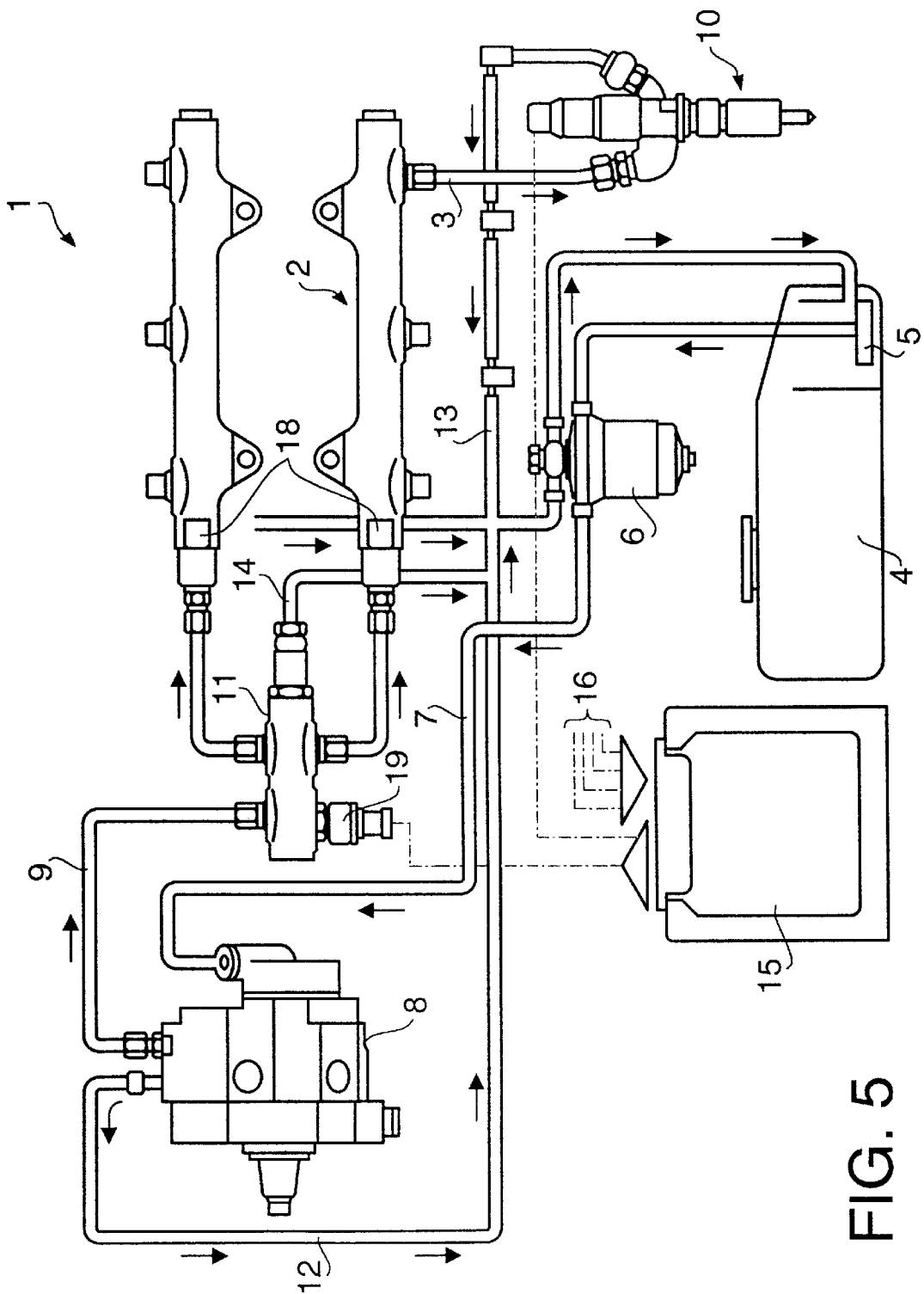
FIG. 5 is an approximate diagram showing one example of a common rail fuel injection system to which the common rail fuel injection device according to the present invention is applied.
Figure 6:
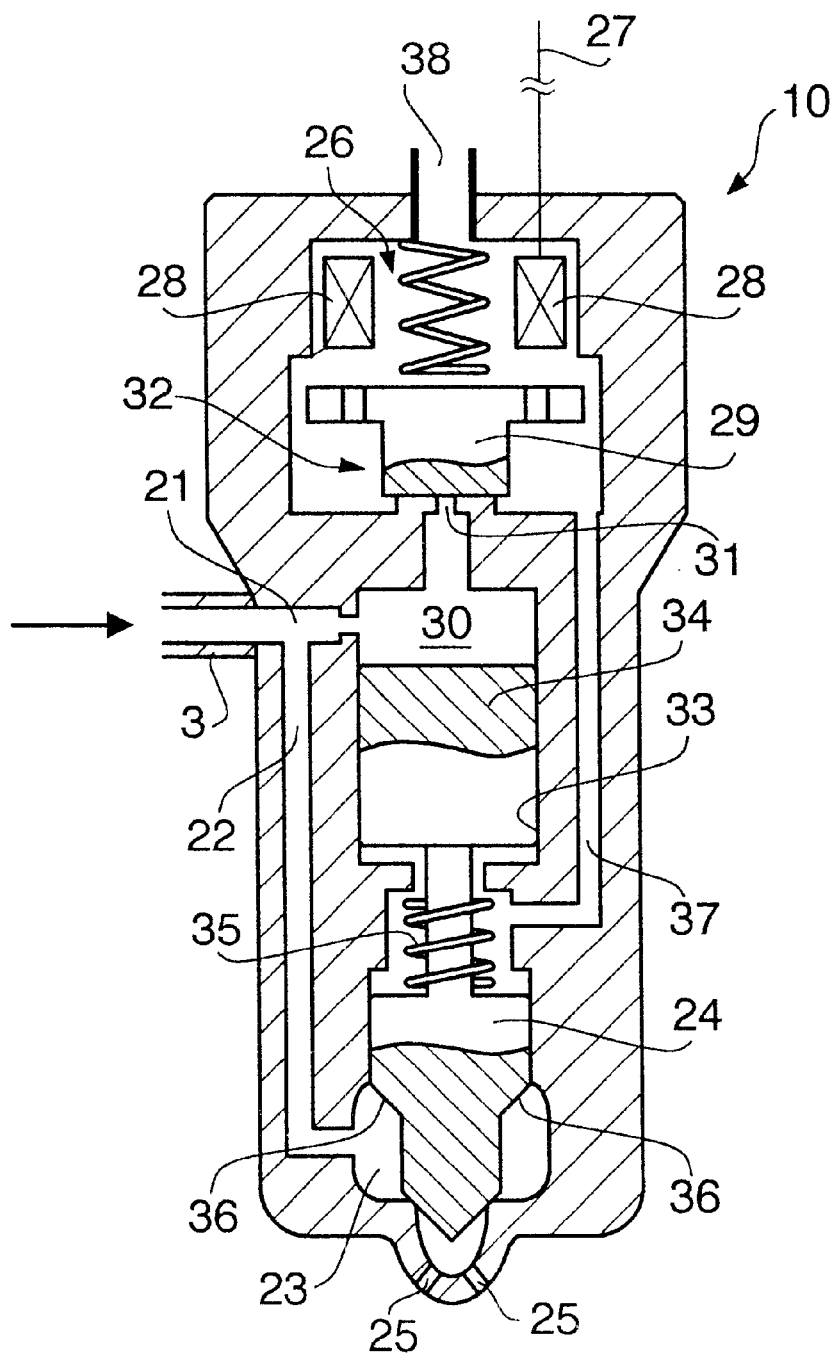
FIG. 6 is a sectional diagram showing one example of an injector used in the common rail fuel injection system illustrated in FIG. 5.

Below, an embodiment of a common rail fuel injection device according to the present invention is described with reference to the drawings. FIG. 1 is a block diagram showing one example of a controller in a common rail fuel injection device according to the present invention; FIG. 2 is a flowchart showing one example of a control flow for determining the pulse width of command pulses for pilot injection and main injection in the common rail fuel injection device illustrated in FIG. 1; FIG. 3 is a flowchart showing one example of a control flow for determining the pulse start timing of command pulses for pilot injection and main injection in the common rail fuel injection device illustrated in FIG. 1; and FIG. 4 is a timing chart for injector drive control in the common rail fuel injection device according to the present invention, namely, it shows graphs indicating command pulses output by the controller, the drive current to the injector, and the amount of lift of the needle in the injector.

The controller 15 shown in FIG. 1 comprises: total fuel injection quantity determining means 40 for determining the total fuel injection quantity Qfnl, based on the engine revolution speed Ne and the amount of accelerator operation Ac; pilot injection quantity determining means 41 and interval period determining means 42 for respectively determining a pilot injection quantity Qp and interval period Tint, based on the total fuel injection quantity Qfnl and the engine revolutions Ne; main injection quantity determining means 43 for calculating a main injection quantity Qm by subtracting the pilot injection quantity Qp from the total fuel injection quantity Qfnl; main injection basic pulse width determining means 44 for determining a basic pulse width Pwmb for the main injection command pulse, based on the main injection quantity Qm and the fuel pressure in the common rail Pr; main injection correction pulse width determining means 45 for determining a correction pulse width Pwmc for the main injection command pulse, based on the interval period Tint and the fuel pressure in the common rail Pr; and main injection pulse width calculating means 46 for calculating the pulse width Pwm for the main injection command pulse CPm by adding the basic pulse width Pwmb and correction pulse width Pwmc for the main injection command pulse.

The controller 15 also comprises pilot injection pulse width determining means 47 for determining the pulse width Pwp of the pilot injection command pulse CPp, based on the pilot injection quantity Qp and the fuel pressure in the common rail Pr; main injection start displacement period determining means 48 for determining a main injection start displacement time ΔSOIm based on the total fuel injection quantity Qfnl and the engine revolution speed Ne; injector drive delay period determining means 49 for determining the injector drive delay period Td based on the interval time Tint and the fuel pressure in the common rail Pr; and main injection command start displacement period determining means 50 for determining the main injection command start displacement period ΔSOCm based on the main injection start displacement period ΔSOIm and the injector drive delay period Td. The controller 15 also comprises pilot injection end delay period determining means 51 for determining the pilot injection end delay period Tdpe based on the pulse width Pwp of the pilot injection command pulse CPp and the fuel pressure in the common rail Pr; and pilot injection command start displacement period calculating means 52 for calculating a pilot injection command start displacement period ΔSOCp by adding together the main injection start displacement period ΔSOIm, the interval period Tint, the pilot injection end delay period Tdpe, and the pulse width Pwp of the pilot injection command pulse CPp. The pulse start time of the pilot injection command pulse CPp is determined by displacement of the pilot injection command start displacement period ΔSOCp with respect to (before or after) the top dead centre.

The fuel injection control in this common rail fuel injection device is now described with reference to the flowcharts in FIG. 2 and FIG. 3, and the timing chart for injector drive control illustrated in FIG. 4. FIG. 4 shows graphs depicting temporal change of (a) the waveform of the command pulse CP, (b) the waveform of the drive current Ic supplied to the injector, and (c) amount of lift of the needle in the injector, against a horizontal time axis, in a case where fuel injection is performed by means of the common rail fuel injection device according to the present invention. As shown in FIG. 4, the controller 15 outputs a pilot injection drive current Icp and main injection drive current Icm to the injector 10, in accordance with the command pulse CPp for pilot injection and the command pulse Cpm for main injection. After starting to apply the respective drive currents, Icp, Icm, the needle of the injector 10 generates lift Lp for pilot injection and lift Lm for main injection, after respective time delays.

As means for detecting the operating state of the engine, for example, there are provided an engine revolution speed sensor for detecting the engine revolution speed Ne, and an accelerator operation amount sensor for detecting the amount of accelerator operation (amount of depression of the accelerator pedal) Ac which indicates the engine load. As shown in FIG. 2, the total fuel injection quantity Qfnl is determined based on the engine revolution speed Ne detected by the engine revolution speed sensor, and the accelerator operation amount Ac detected by the accelerator operation amount sensor, by consulting previously determined map data (not illustrated) (step 1). The pilot injection quantity Qp is determined base on the total fuel injection quantity Qfnl and the engine revolution speed Ne, by consulting previously determining map data (not illustrated) (step 2).

The main injection quantity Qm is calculated by subtracting the pilot injection quantity Qp from the total fuel injection quantity Qfnl (step 3). The interval period Tint (crank angle) from the end time of the pilot injection to the start time of the main injection is determined based on the total fuel injection quantity Qfnl and the engine revolution speed Ne (step 4). As shown in the timing chart depicted in FIG. 4, viewed in terms of the lifting of the needle in the injector 10, the interval time Tint (crank angle) is the period indicated by [3] in FIG. 4, from the injection end time T4 for the pilot injection where needle lift for pilot injection terminates, to the injection start time T6 for the main injection where needle lift is restarted for the main injection. Even during the same injection cycle, the higher the fuel pressure in the common rail Pr, the greater the amount of fuel injected, and therefore, the fuel pressure in the common rail Pr detected by the pressure sensor 18 is taken into account when determining the basic pulse width Pwm of the main injection command pulse for driving the actuator of the injector 10 in order to inject the main injection quantity Qm (step 5).

The interval period Tint (crank angle) is converted to an interval period Tint (time, unit: msec) based on the engine revolution speed Ne (step 6). A correction pulse width Pwmc (msec) for correcting the basic pulse width Pwmb of the main injection command pulse CPm is calculated based on the converted interval period Tint (msec) and the fuel pressure in the common rail Pr (step 7). Although the correction pulse width Pwmc (msec) is calculated with reference to the length of the interval period Tint, the shorter the interval period Tint, the greater the tendency for delay to occur in the main injection period in the main injection due to insufficient energy in the actuator drive current, and hence the correction pulse width Pwmc is corrected in such a manner that it becomes longer, the shorter the interval time Tint.

It is then judged whether or not pilot injection is to be implemented (step 8). If pilot injection is to be performed, then the pulse width Pwm of the main injection command pulse CPm is calculated by adding the correction pulse width Pwmc to the basic pulse width Pwmb for the main injection command pulse CPm (step 9). As indicated by [6] in the timing chart in FIG. 4, the pulse width Pwm of the main injection command pulse CPm goes from the pulse start time T5 of the main injection command pulse, which is the fall timing of the main injection command pulse CPm, of the command pulses CP output by the controller 15, to the pulse end time T8 which is the rise timing of CPm. Since there is a response delay in the injector 10, the main injection start time T6, which represents the end time of the interval period Tint, is delayed by an injector drive delay time period Td, indicated by [5], with respect to the pulse start time T5.

Next, similarly to the main injection, even during the same injection cycle, the higher the fuel pressure in the common rail Pr, the greater the amount of fuel injected, and therefore the fuel pressure in the common rail Pr is taken into account when determining the pulse width Pwp of the pilot injection command pulse CPp for injecting the pilot injection quantity Qp (step 10). As shown by [1] in the timing chart in FIG. 4, the pulse width Pwp of the pilot injection command pulse CPp is a pulse width from the pulse start time T1 which is the fall time of the pilot injection command pulse CPp of the command pulses CP output by the controller 15, to the pulse end time T3 at which CPp rises. If, on the other hand, it is judged at step 8 that no pilot injection is to be performed, then since no interval period exists, the basic pulse width Pwmb for the main injection command pulse CPm calculated at step 5 is set directly as the pulse width Pwm of the main injection command pulse CPm (step 11).

As shown by the injection pulse output timing determining flowchart in FIG. 3, each of the various timings involved in fuel injection is determined with reference to the top dead centre (TDC) which is represented by timing T7 for each respective cylinder. The period before the top dead centre is indicated by BTDC and the period after the top dead centre is indicated by ATDC. As shown by [4] in FIG. 4, the injection start timing T6 which is the target start time at which the main injection will start is determined, based on the total fuel injection quantity Qfnl and the engine revolution speed Ne, as a main injection start displacement period ΔSOIm (crank angle), which is an angular displacement for the top dead centre time T7 (as shown in FIG. 4, this timing is not always placed before the top dead centre timing T7, but in some cases, may be delayed after the top dead centre timing T7) (step 21). The interval period Tint (crank angle) shown in [3] FIG. 4 is converted to an interval period Tint (unit msec) expressed as time, based on the engine revolution speed Ne (step 22). The injector drive delay period Td (msec) is determined from the converted interval period Tint (msec) and fuel pressure in the common rail Pr, based on a previously determined map, or the like, as the delay response between the pulse start time T5 of the main injection command pulse CPm indicated by [5] in FIG. 4, and the injection start time T6 at which the injector 10 actually starts to lift and fuel starts to be injected (step 23). The shorter the interval period Tint, the less sufficient the recovery of the drive current energy for driving the injector, and therefore the injector drive delay period Td increases as the interval period Tint becomes shorter. The injector drive delay period Td (msec) in terms of time is converted to an injector drive delay period Td (crank angle) in terms of crank angle, by taking account of the engine revolution speed Ne (step 24).

By adding the main injection start displacement period ΔSOIm (crank angle) determined at step 21 and the injector drive delay period Td (crank angle) converted at step 24, the main injection command start displacement period ΔSOCm (crank angle) for the main injection command pulse CPm is determined, as indicated by [7] in FIG. 4 (step 25). In other words, the pulse start time T5 of the main injection command pulse CPm is set to a timing advanced (or delayed) by the main injection command start displacement period ΔSOCm (crank angle), with respect to the top dead centre time T7. The main injection command start displacement period ΔSOCm determines the timing T5, which is further advanced by the injector drive delay period Td derived according to the interval period Tint, with respect to the injection start time T6 determined by the main injection start displacement period ΔSOIm; if the interval period Tint becomes short, then the pulse start time T5 of the main injection command pulse is advanced significantly, by means of the injector drive delay period Td being set to a long value in accordance with the interval period Tint, in such a manner that the main injection starts reliably at the injection start time T6 as desired.

The pilot injection end delay period Tdpe (msec) is determined based on the fuel pressure in the common rail Pr and the pilot injection pulse width Pwp (msec) (step 26). In other words, the pilot injection end delay period Tdpe (msec) indicated by [2] in FIG. 4 is determined in accordance with the magnitude of the fuel pressure in the common rail Pr, as the period from the end time T3 of the pilot injection pulse width Pwp, which is the rise timing of the pilot injection command pulse CPp, after which the lifting of the needle of the injector 10 for pilot injection terminates, to the start time T4 of the interval period Tint. The pilot injection end delay period Tdpe is set to a greater value, as the fuel pressure in the common rail increases. The pilot injection end delay period Tdpe (msec) in terms of time is converted into a pilot injection end delay period Tdpe (crank angle) in terms of crank angle, by taking the engine revolution speed Ne into account (step 27).

The pulse width Pwp (msec) of the pilot injection command pulse CPp in terms of time is converted from the pilot injection pulse width Pwp (crank angle) in terms of crank angle, by taking the engine revolution speed Ne into account (step 28). Finally, by combining the main injection start displacement period ΔSOIm (crank angle) calculated at step 21, the interval period Tint (crank angle) determined at step 4, the pilot injection end delay period Tdpe (crank angle) obtained by converting at step 27, and the pulse width Pwp (crank angle) of the pilot injection command pulse CPp obtained by converting at step 28, the pilot injection command start displacement period ΔSOCp (indicated by [8] in FIG. 4) is calculated as an angular displacement from the top dead centre T7, in order to determine the pulse start time T1 of the pilot injection command pulse CPp output by the controller 15 (step 29). The pilot injection start displacement period ΔSOIp (crank angle), which is the timing at which the needle of the injector 10 starts to lift for pilot injection, is indicated by the period [9] in FIG. 4.

As described above, since the pulse start time T1 of the pilot injection command pulse CPp is determined by taking account of the pilot injection end delay period Tdpe which can be inferred accurately based on the operating state of the engine, the interval period Tint which differentiates the pilot injection and the main injection can be ensured reliably, and hence controllability of the pilot injection is improved and the functions of the pilot injection in suppressing noise and improving exhaust gas characteristics is satisfactorily displayed.

In the aforementioned description of the embodiment, in the pilot injection end delay period determining means 51 and in step 26, the pilot injection end delay period Tdpe is determined based on the pulse width Pwp of the pilot injection command pulse CPp and the actual fuel pressure in the common rail Pr as detected by the pressure sensor 18. However, in the case of a common rail 2 having good pressure controllability, it is possible to substitute the actual fuel pressure in the common rail with a target fuel pressure in the common rail Pr determined from the operating state of the engine, such as the engine revolution speed, or fuel injection quantity (accelerator operation amount). Moreover, since the pulse width Pwp of the pilot injection command pulse CPp is determined based on the pilot injection quantity Qp and the fuel pressure in the common rail Pr, then ultimately the pilot injection end delay period Tdpe can be determined by calculation from the operating state of the engine.

According to the common rail fuel injection device according to the present invention, fuel is injected into combustion chambers from injectors, due to the action of the pressure of operating fluid accumulated in a common rail in a pressurized state, and a controller controls fuel injection from the injectors based on the fuel injection quantity determined according to detection signals from detecting means detecting the operating state of the engine. Since the controller determines the pilot injection end delay period from the pulse end time of the pilot injection command pulse to the injection end time of the pilot injection, based on the operating state of the engine, the pilot injection end delay period is determined in accordance with the operating state of the engine and the interval period differentiating the pilot injection and the main injection can be ensured reliably, the controllability of the pilot injection can be improved, even in cases where the fuel pressure in the common rail is high, and hence the beneficial effects of the pilot injection in suppressing combustion noise, preventing deterioration of exhaust gas characteristics, and the like, can be preserved.

What is claimed is:

1. A common rail fuel injection device comprising:
   a common rail for accumulating pressurized fuel from a high-pressure fuel supply pump;
   a detecting means for detecting an operating state of an engine; and
   an injector for injecting fuel supplied from said common rail into a combustion chamber, said injector divides fuel injection into the main injection and the pilot injection with an interval period prior to said main injection, in accordance with an operating state of the engine detected by the detecting means;
   a controller for calculating command pulses and outputting drive signals corresponding to said command pulses to the injector,
   wherein said controller calculates the interval period prior to said main injection, a pilot injection end delay period from the pulse end of said pilot injection command pulse to the pilot injection end, and a period corresponding to pulse width of said pilot injection command pulse corresponding to said pilot injection quantity, in response to said operating state of the engine as detected by said detecting means,
   and said controller sets the pulse start time of said pilot injection command pulse by being advanced by said interval period, said pilot injection end delay period and said period corresponding to pulse width of said pilot injection command pulse from previously determined injection start time of said main injection.

2. The common rail fuel injection device according to claim 1, wherein said controller calculates said pilot injection end delay period based on the fuel pressure in said common rail as detected by a pressure sensor provided in said common rail, or a target fuel pressure in said common rail calculated from the operating state of said engine.

3. The common rail fuel injection device according to claim 2, wherein said controller sets the pilot injection end delay period to a greater value, as the fuel pressure in said common rail increases.

4. The common rail fuel injection device according to claim 1, wherein said injectors each comprise:
   a pressure control chamber into which a portion of the fuel supplied from said common rail is introduced;
   a needle valve which opens and closes nozzles for injecting fuel formed in the front end section of said injector, by being raised or lowered due to the action of the pressure of fuel inside said pressure control chamber;
   an open/shut valve for releasing the fuel pressure inside said pressure control chamber by discharging fuel from inside said pressure control chamber; and
   an actuator for operating said open/shut valve.

* * * * *